2 Sheets—Sheet 1.
A. K. RIDER,
Assignor, by mesne assignments, to C. H. DELAMATER, G. H. REYNOLDS & T. J. RIDER.
Air Engine.
No. 9,353. Reissued Aug. 24, 1880.
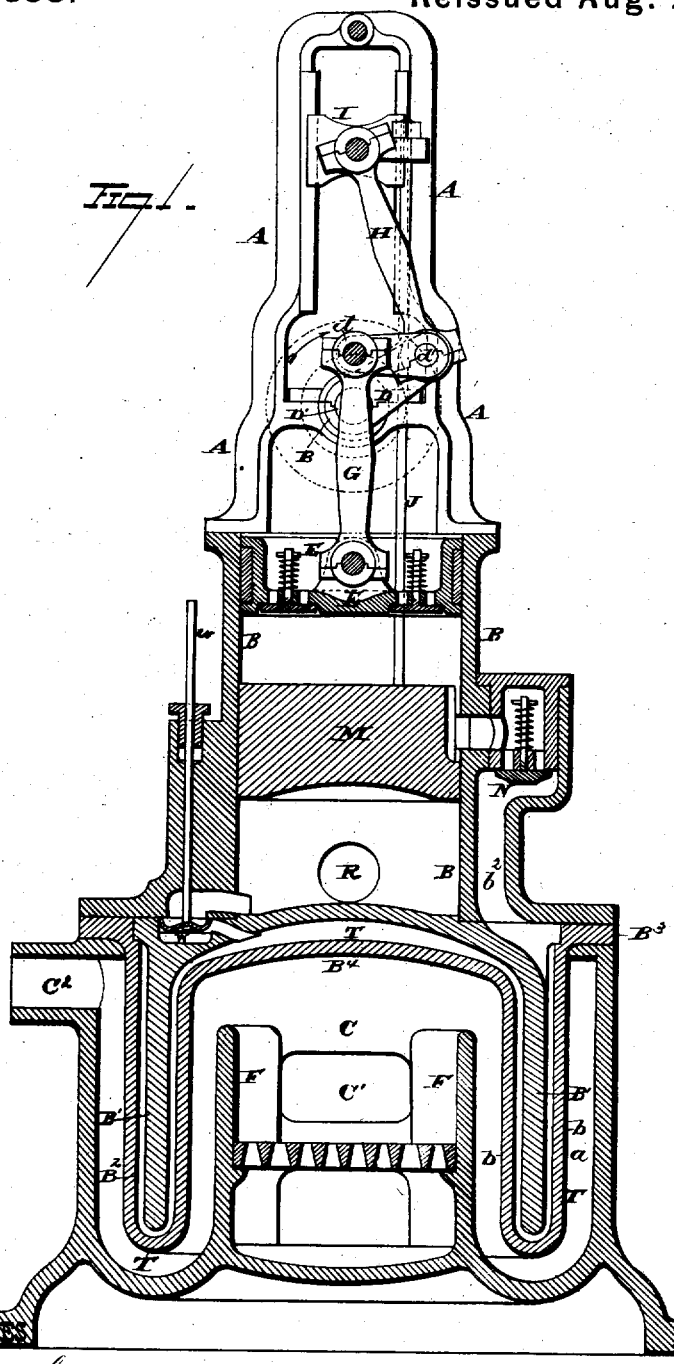
WITNESSES:
E. S. Nottingham
A. S. Lawrence.
INVENTOR.
A. K. Rider.
By H. A. Seymour.
ATTORNEY 2 Sheets—Sheet 2.

A. K. RIDER,

Assignor, by mesne assignments, to C. H. DELAMATER, G. H. REYNOLDS & T. J. RIDER.

Air Engine.

No. 9,353. Reissued Aug. 24, 1880.

WITNESSES

E. J. Nottingham

A. L. Lawrence

INVENTOR

A. K. Rider.

By H. A. Seymour.

ATTORNEY

UNITED STATES PATENT OFFICE.

ALEXANDER K. RIDER, OF WALDEN, N. Y., ASSIGNOR, BY MESNE ASSIGNMENTS, TO CORNELIUS H. DELAMATER, GEORGE H. REYNOLDS, AND THOMAS J. RIDER, OF NEW YORK CITY.

AIR-ENGINE.

SPECIFICATION forming part of Reissued Letters Patent No. 9,353, dated August 24, 1880.

Original No. 111,088, dated January 17, 1871. Application for reissue filed July 19, 1880.

*To all whom it may concern:*

Be it known that I, ALEXANDER K. RIDER, of the city and county of New York, in the State of New York, have invented certain new and useful Improvements in Air-Engines; and I do hereby declare that the following is a full and exact description thereof.

The object of my invention is to provide a heater for air-engines which shall be simple and durable in its construction and of such shape that the air will be forced in direct contact with a large area of heated metal surface on the interior of the heater, and thus utilize the maximum quantity of heat radiated from the interior surface of heater; and with this end in view my invention consists in a heater for air-engines consisting, essentially, of a cylinder provided with an outwardly-projecting flange at its upper end and with an annular air-chamber extending downward and entirely around the inner dome-shaped bottom of the heater, the entire heater being cast in a single piece.

My invention further consists in an air-engine provided with a heater having an annular air-chamber extending around the inner dome-shaped bottom of the heater and a deflecting-tube extending into the annular air-chamber and forming a close joint at its upper end with the power-cylinder.

The accompanying drawings form a part of this specification.

Figure 3:
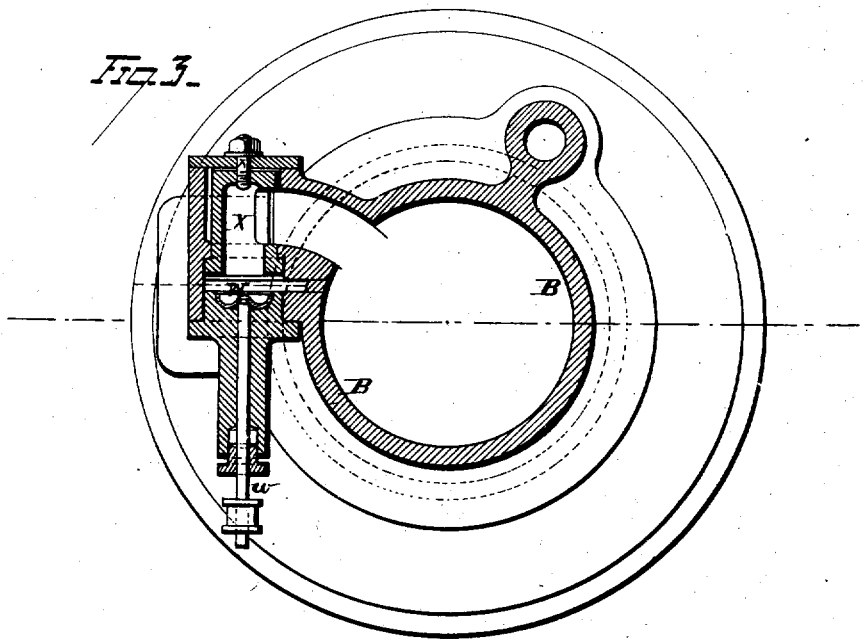
Figure 2:
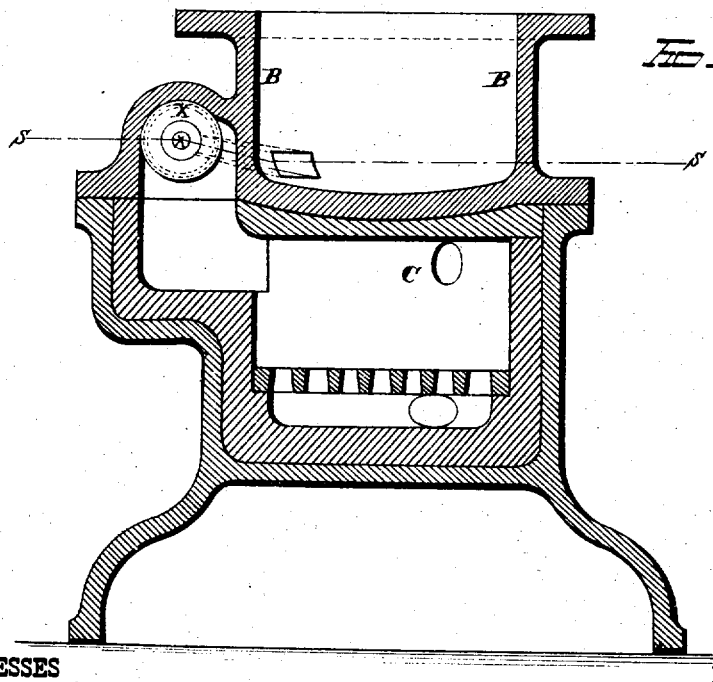

Figure 1 is a central vertical section through the entire engine, showing clearly the novel part, with so much of the ordinary part as is necessary to indicate their relations thereto. Fig. 2 is a corresponding vertical section through the furnace and adjacent parts, showing a modified construction of parts. Fig. 3 is a horizontal section on the line S S in Fig. 2.

Similar letters of reference indicate like parts in all the figures.

B is the cylinder, and A a framing fixed thereon, while D is the crank upon a main shaft, D′, to which the power is communicated. E is a piston, which I term, for convenience, the "working" piston; G, the connecting-rod leading from the working-piston E to the main crank-pin *d*.

M is a piston which, to avoid confusion, I term the "shifter" or "changing" piston, and J two small parallel rods, which serve as piston-rods to the shifter and connect it to a cross-head, I, traversing in ways or guides in the framing A.

H is a connection through which the proper motion is communicated to the cross-head I, and thus to the changing piston or shifter M from a crank-pin, *d′*, which is formed in the solid forging, or is otherwise mounted in the position represented relatively to the other part, it being understood that the upper piston should be packed and that the lower piston or shifter should be fitted to work with tolerable tightness without packing; that the lower piston may be hollow and filled with charcoal or analogous non-conductor, and that the most highly-heated parts may be defended by a coating of fire-brick or the like, and that other ordinary and suitable devices may be employed at various points to promote the end sought. The valve N opens downwardly automatically to allow the air to be shifted from its cool position above the shifter to the heated space below the shifter.

The lower end of cylinder B is provided with a deflecting-tube, B′, which extends downwardly into the annular air-chamber $B^2$ of the heater T, which latter is cast in a single piece and provided at its upper end with an outwardly-projecting flange, $B^3$, by means of which the heater is supported in proper position above the furnace-grate. The annular air-chamber $B^2$, formed by the walls *a b*, extends around and below the inner dome-shaped bottom, $B^4$, of the heater. The lower end of the heater, being of inverted-cup shape, presents a large metal surface to the action of the flame in the furnace or fire-box, and as the charge of air is caused to flow in direct contact with the inner surface of the walls *a* and *b*, forming the annular air-chamber $B^2$, it is quickly heated and expanded in volume.

B′ is the shield or deflector. Its office is to cause the inflowing air to come into close contact with the walls of the heater, and for this purpose it is made to extend downward into the annular air-chamber of the heater, and is of such dimensions as to allow but a small space between the deflector and the interior surfaces of the heater, and through this limited space the air flows in a thin sheet, which is very efficient in heating the air. The upper end of the deflector also forms a close joint with the power-cylinder, in order to cause all the air to pass the lower and more highly-heated portion of the annular air-chamber.

The hot gases from the furnace, after expending a portion of their heat against the bottom of the heater, where it is very directly applied to the heating of the air above, is deflected and flows downwardly in contact with the inner wall, *b*, of the depending annular air-chamber $B^2$, and beneath the same, and then upwardly in contact with the outer wall, *a*, of said air-chamber, thereby imparting heat to both walls of the annular air-chamber $B^2$, and ultimately escaping through the flue $C^2$, leading to a chimney. (Not represented.)

R is an exhaust-valve passage controlled by an exhaust-valve (not represented) worked by eccentrics or suitable cams or the like. (Not represented.) Its function, as also those of other parts not here explained fully, corresponds with those of similar parts in the air-engine patented by John Ericsson in 1855 and 1858.

W is a valve which performs an important function in controlling the supply of air from the hot spaces around and in contact with the casting T to the base of the working-cylinder or cylinder proper. This valve W is worked by a rod, *w*, passing out through a stuffing-box and actuated by a cam or other suitable part upon the engine. (Not represented.) Its function is to hold back the supply of air to the base of the cylinder, and thus render it practicable to accumulate a considerable pressure of air in the heating-chambers while the exhaust-passage R is open.

A little before the changing piston has descended to its lowest depression the valve W is lifted or moved from its seat, and the hot air, under high pressure, is allowed to enter and heat the changing piston in the last portion of its descent. It continues to flow into the cylinder and force up the changing piston M and its associated working-piston E, and gives motion actively to the engine.

I make the valve W in a dishing form by forging it or working it with dies from thin boiler-iron or analogous material, which will yield by its elasticity to adapt itself to any slight warping or change of position of the parts. It is operated by a rod, *w*, so as to move it back into a cavity, as represented, when not in use. This withdrawal of the valve W takes it out of the current of heated air and keeps it at a much lower temperature than it would otherwise attain. Its seat is formed in a casting separate from the main cylinder. (See Figs. 2 and 3.) It may be accurately turned and faced to adapt it to the correspondingly-finished face or rim of the valve W.

The removable seat is indicated by X, and a screw-bolt, which retains it in place, is marked *x*.

The valve W may be worked horizontally or vertically, or in various inclined and intermediate positions, as convenience may dictate.

The current of intensely-hot gases from the heating chamber or furnace is led to the cut-off valve through a narrow aperture, as shown, and not only is the valve arranged to be drawn back out of the direct impact of this hot current, but the seat X is also, to some extent, similarly protected. The hot gas is not allowed to strike it directly; its position partially protects it from the heat.

The connecting-rod G, reaching from the crank-pin downward to the main piston, compels a lingering of the main piston on the upper center, or at the top of its stroke, to give a long time in which cool air may be drawn through its valves, while the connection H, reaching upward from the crank-pin *d'* to the cross-head I, connected to the shifter, compels a lingering of the latter on the lower center. This gives a very desirable relation of the motions and distances apart of the two pistons throughout the active revolution, while all the motions are smooth crank-motions. This noiseless and very nearly absolutely correct motion, obtained in this simple manner, is equally available with an outside furnace, as represented, or with a closed furnace, in which the fire should be maintained under pressure, or with various other modifications.

It is evident that my improved form and construction of heater may be applied to air-engines differing in many respects from the form and construction of engine herein shown and described, and hence I would have it understood that I do not limit myself to the employment of a heater embracing my invention in any particular type or construction of air-engines; but, Having fully described my invention, what I claim as new, and desire to secure by Letters Patent, is—

1. A heater for air-engines consisting of a cylinder provided with an outwardly-projecting flange at its upper end and with an annular air-chamber extending downward and entirely around the bottom of the heater, the entire heater being cast in a single piece, substantially as set forth.

2. In an air-engine, a deflecting-tube arranged to extend into the annular air-chamber of the heater and form a close joint at its upper end with the power-cylinder, substantially as set forth.

3. In an air-engine, a heater having an inner dome-shaped bottom and a depending annular air-chamber, and a deflecting-tube extending down into said annular air-chamber and forming an air-passage through which air will be caused to flow in direct contact with the inner surface of the heater, substantially as set forth.

In testimony whereof I have hereunto set my hand in the presence of two subscribing witnesses.

ALEXANDER K. RIDER.

Witnesses:

GEO. W. STODDARD,

C. W. SADLIER.